United States Patent
Ikeda et al.

(10) Patent No.: US 8,103,848 B2
(45) Date of Patent: Jan. 24, 2012

(54) MEMORY CONTROL DEVICE AND INFORMATION PROCESSING APPARATUS

(75) Inventors: Noritaka Ikeda, Kanagawa (JP); Kazunori Yamaguchi, Tokyo (JP); Ken Mabuchi, Kanagawa (JP)

(73) Assignee: Sony Corporation, Tokyo (JP)

( * ) Notice: Subject to any disclaimer, the term of this patent is extended or adjusted under 35 U.S.C. 154(b) by 435 days.

(21) Appl. No.: 12/453,957

(22) Filed: May 28, 2009

(65) Prior Publication Data
US 2009/0313450 A1 Dec. 17, 2009

(30) Foreign Application Priority Data
Jun. 11, 2008 (JP) ................................ 2008-152642

(51) Int. Cl.
*G06F 12/00* (2006.01)
*G06F 13/00* (2006.01)
*G11C 8/00* (2006.01)

(52) U.S. Cl. ................ 711/202; 711/170; 711/E12.002; 365/230.01; 365/230.03; 365/241

(58) Field of Classification Search .................. 711/170, 711/202, E12.002; 365/230.01, 230.03, 241
See application file for complete search history.

(56) References Cited

FOREIGN PATENT DOCUMENTS
JP 08-036520 2/1996

*Primary Examiner* — Ly D Pham
(74) *Attorney, Agent, or Firm* — Rader, Fishman & Grauer PLLC

(57) ABSTRACT

An information processing apparatus includes a memory configured such that structural data areas holding therein structural data, each being constituted by a plurality of pieces of element data, are allocated to a plurality of memory banks, an address area detecting unit configured to detect whether an address value used to access the memory is included in a specific address area including an address used to access the plurality of pieces of element data and an address converting unit configured to convert the address value to an address value for the structural data area in the case that it has been detected that the address value is included in the specific address area.

8 Claims, 13 Drawing Sheets

FIG. 5

| ELEMENT DATA | PHYSICAL ADDRESS | VIRTUAL ADDRESS |
| --- | --- | --- |
| Y0 | 0×0000 | 0×4000 |
| R0 | 0×0001 | 0×5000 |
| G0 | 0×0002 | 0×6000 |
| B0 | 0×0003 | 0×7000 |
| Y1 | 0×0004 | 0×4001 |
| R1 | 0×0005 | 0×5001 |
| G1 | 0×0006 | 0×6001 |
| B1 | 0×0007 | 0×7001 |
| Y2 | 0×0008 | 0×4002 |
| R2 | 0×0009 | 0×5002 |
| G2 | 0×000a | 0×6002 |
| B2 | 0×000b | 0×7002 |
| Y3 | 0×000c | 0×4003 |
| R3 | 0×000d | 0×5003 |
| G3 | 0×000e | 0×6003 |
| B3 | 0×000f | 0×7003 |
| Y4 | 0×0010 | 0×4004 |
| R4 | 0×0011 | 0×5004 |
| G4 | 0×0012 | 0×6004 |
| B4 | 0×0013 | 0×7004 |

FIG. 6A

| ADDRESS | PIXEL DATA | | | | REMARKS |
|---|---|---|---|---|---|
| | #3 | #2 | #1 | #0 | |
| 0×0000 | B0 | G0 | R0 | Y0 | 0th PIXEL DATA |
| 0×0004 | B1 | G1 | R1 | Y1 | 1st PIXEL DATA |
| 0×0008 | B2 | G2 | R2 | Y2 | 2nd PIXEL DATA |
| 0×000c | B3 | G3 | R3 | Y3 | 3rd PIXEL DATA |
| 0×0010 | B4 | G4 | R4 | Y4 | 4th PIXEL DATA |
| | | | | | |

FIG. 6B

| ADDRESS | PIXEL DATA | | | | REMARKS |
|---|---|---|---|---|---|
| | #3 | #2 | #1 | #0 | |
| 0×4000 | Y3 | Y2 | Y1 | Y0 | 0th TO 3rd PIXEL Y DATA |
| 0×4004 | Y7 | Y6 | Y5 | Y4 | 4th TO 7th PIXEL Y DATA |
| 0×4008 | Y11 | Y10 | Y9 | Y8 | 8th TO 11th PIXEL Y DATA |
| 0×400c | Y15 | Y14 | Y13 | Y12 | 12th TO 15th PIXEL Y DATA |
| 0×4010 | Y19 | Y18 | Y17 | Y16 | 16th TO 19th PIXEL Y DATA |
| | | | | | |

FIG. 9

| AREA ADDRESS A[15:12] | AREA | IN-BANK ADDRESS | BANK ADDRESS |
|---|---|---|---|
| 0b00XX | PHYSICAL AREA | A[13:4] | A[3:2] |
| 0b0100 | VIRTUAL AREA Y | A[11:2] | A[1:0] |
| 0b0101 | VIRTUAL AREA R | | |
| 0b0110 | VIRTUAL AREA G | | |
| 0b0111 | VIRTUAL AREA B | | |

MEMORY CONTROL DEVICE AND INFORMATION PROCESSING APPARATUS

BACKGROUND OF THE INVENTION

1. Field of the Invention

The present invention relates to a memory control device and more particularly to a memory control device and an information processing apparatus configured to perform address conversion in accordance with an address value for a memory.

2. Description of the Related Art

In image processing, pixel data which is information relating to a luminance and a color of each pixel of an image may be expressed as structural data. For example, pixel data of one pixel is classified into a luminance component indicative of the luminance of a pixel concerned and a color component indicative of the color of the pixel concerned. The color component may be divided into components of respective colors.

In the case that data processing is to be executed on the basis of the structural data mentioned above, it may be necessary to read out data from a memory into a processor to extract element data necessary for execution of the processing from the data so read out and hence there may be a problem in that the load imposed on the processor and the time necessary for execution of the processing would be increased. In addition, since necessary data is extracted after the data has been read out into the processor, data which is not necessary for execution of the processing is also transferred temporarily via a bus together with the necessary data, so that there may be a problem in that the bus access volume would be increased.

Thus, in order to decrease the number of arithmetic operations to be executed in the processing mentioned above, there has been proposed a device in which an arithmetic unit configured to perform a given arithmetic operation on data which has been read out using a multi-address is installed in a bus to select arithmetic means in accordance with an address (see, for example, Japanese Laid-Open Patent Publication No. 08-36520 (FIG. 1)).

SUMMARY OF THE INVENTION

However, in the above mentioned example of the related art, data which has been read out from a memory by using a physical address is only subjected to an arithmetic operation and transferred as a single unit and it is difficult to handle element data constituting structural data as a unit. Thus, it is difficult to reduce the bus access volume. In addition, due to installation of the arithmetic unit in the data bus, it may lack in flexibility.

The present invention has been conceived of in view of the above mentioned circumstances. Thus, it is desirable to extract specific element data from structural data to be handled in the lump.

According an embodiment of the present invention, there is provided an information processing apparatus including a memory configured such that structural data areas holding therein structural data, each being constituted by a plurality of pieces of element data, are allocated to a plurality of memory banks, an address area detecting unit configured to detect whether an address value used to access the memory is included in a specific address area including an address used to access the plurality of element data and an address converting unit configured to convert the address value to an address value for the structural data area in the case that it has been detected that the address value is included in the specific address area. As a result, such operational effect may be brought that the address value used to access the specific address area in an internal memory constituted by the plurality of memory banks is converted to the address value for the structural data area.

According to the above mentioned embodiment, the plurality of pieces of element data may be packaged into one word and each of a plurality of words may be held in the structural data as an element of an array, the plurality of words may be sequentially allocated to different memory banks of the plurality of memory banks on a word-by-word basis, and the address converting unit may be configured to convert the address value such that, in the case that it has been detected that the address value is included in the specific address area, the plurality of pieces of element data included in the structural data respectively allocated to the plurality of memory banks are simultaneously accessed from the plurality of memory banks in one-to-one correspondence. As a result, such operational effect may be brought that as for accessing the specific address area, the plurality of pieces of element data are simultaneously accessed from the plurality of memory banks in one-to-one correspondence.

In the above mentioned embodiment, the apparatus may further include a write data sorting unit configured to sort write data such that, in the case that it has been detected that the address value is included in the specific address area, element data included in the write data of the same size as the structural data are written into the plurality of memory banks in one-to-one correspondence. As a result, such operational effect may be brought that the element data included in the write data of the same size as the structural data are written into the plurality of memory banks in one-to-one correspondence.

In the above mentioned embodiment, the apparatus may further include a read data sorting unit configured to sort the element data read out from the plurality of memory banks in one-to-one correspondence as read data of the same size as the structural data in the case that it has been detected that the address value is included in the specific address area. As a result, such operational effect may be brought that the element data which have been read out from the plurality of memory banks in one-to-one correspondence are supplied as the read data of the same size as the structural data.

According to the above mentioned embodiment, the structural data may be pixel data of an image and the plurality of pieces of element data may be component data relating to a luminance or a color of the pixel data. In an embodiment of the present invention, it is supposed that a Y component indicates the component data relating to the luminance of the pixel data and R, G and B components indicate the component data relating to the colors thereof by way of example.

According to another embodiment of the present invention, there is provided a memory control device including an address area detecting unit configured to detect whether an address value used to access a memory configured such that structural data areas holding therein structural data, each being constituted by a plurality of pieces of element data, are allocated to a plurality of memory banks is included in a specific address area including an address used to access the plurality of pieces of element data and an address converting unit configured to convert the address value to an address value for the structural data area in the case that it has been detected that the address value is included in the specific address area. As a result, such operational effect may be brought that the address value used to access the specific address area in the memory constituted by the plurality of memory banks is converted to the address value for the structural data area.

According to a further embodiment of the present invention, there is provided an information processing apparatus including a memory configured such that structural data areas holding therein structural data, each being constituted by a plurality of pieces of element data, are allocated, an address area detecting unit configured to detect whether an address value used to access the memory is included in a specific address area including an address used to access the plurality of pieces of element data and an address converting unit configured to convert the address value to an address value for the structural data area in the case that it has been detected that the address value is included in the specific address area. As a result, such operational effect may be brought that the address value used to access the specific address area in an internal memory is converted to the address value for the structural data area.

According to a still further embodiment of the present invention, there is provided a memory control device including an address area detecting unit configured to detect whether an address value used to access a memory configured such that structural data areas holding therein structural data, each being constituted by a plurality of pieces of element data, are allocated is included in a specific address area including an address used to access the plurality of pieces of element data and an address converting unit configured to convert the address value to an address value for the structural data area in the case that it has been detected that the address value is included in the specific address area. As a result, such operational effect may be brought that the address value used to access the specific address area in the memory is converted to the address value for the structural data area.

According to the present invention, such effect may be taken that the specific element data are extracted from the structural data and are handled all together.

BRIEF DESCRIPTION OF THE DRAWINGS

FIG. 5 is a chart showing an example of a corresponding relation among element data, physical addresses and virtual addresses according to an embodiment of the present invention;

FIG. 6A is a chart showing an example of a corresponding relation between element data and addresses according to an embodiment of the present invention;

FIG. 6B is a chart showing an example of a corresponding relation between element data and addresses according to an embodiment of the present invention;

FIG. 9 is a chart showing an example of a corresponding relation between area addresses and bit arrays of addresses according to an embodiment of the present invention;

DESCRIPTION OF THE PREFERRED EMBODIMENTS

Next, a preferred embodiment of the present invention will be described with reference to the accompanying drawings.

Figure 1:
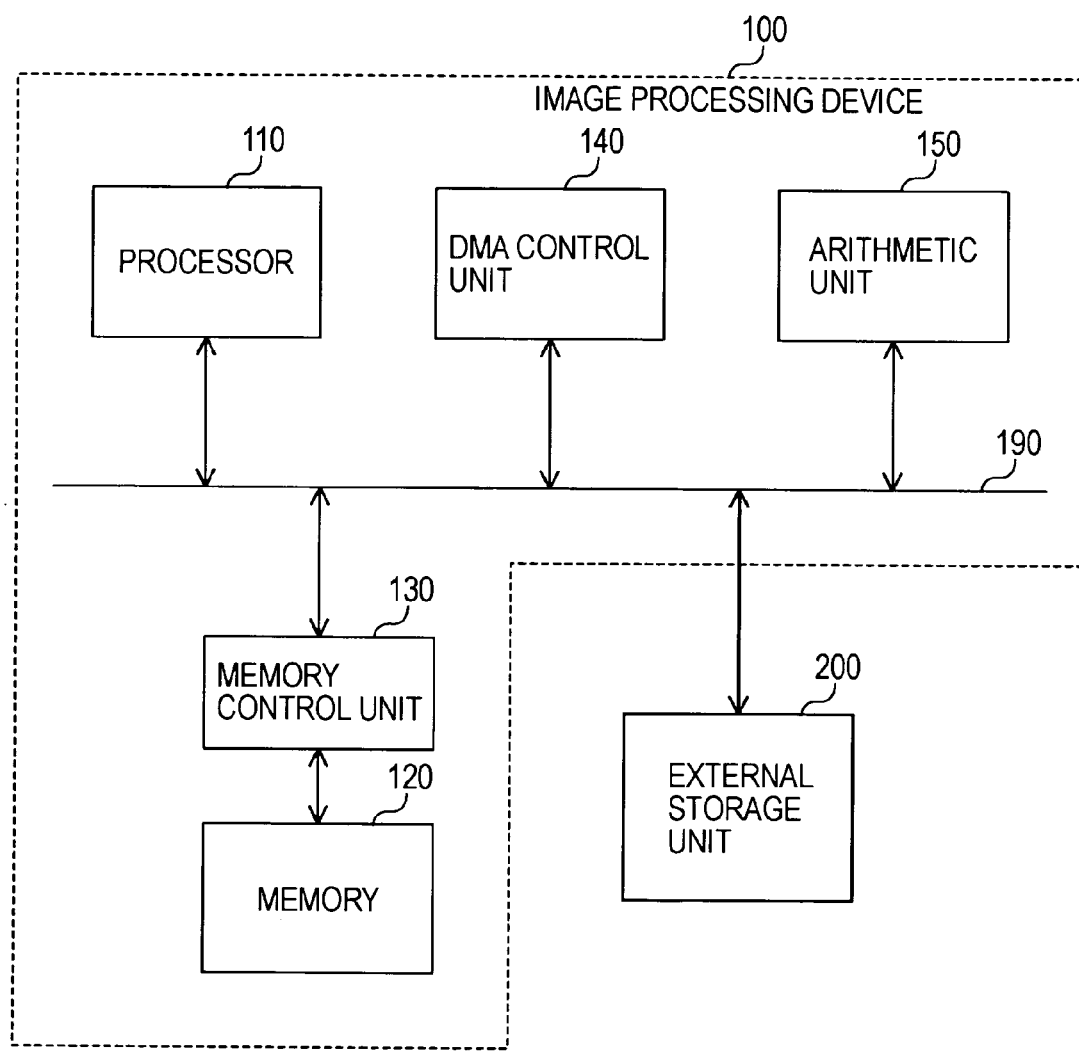
FIG. 1 is a diagram showing one structural example of an information processing apparatus according to an embodiment of the present invention.

FIG. 1 is a diagram showing a structural example of an information processing apparatus according to an embodiment of the present invention. The information processing apparatus includes an image processing device 100 and an external storage unit 200. The image processing device 100 is configured to perform image processing on image data. The external storage unit 200 is configured to store image data to be subjected to image processing. The image data stored in the external storage unit 200 is fetched into a memory built into the image processing device 100 to perform image processing on the image data. The image processing device 100 includes a processor 110, a memory 120, a memory control unit 130, a DMA control unit 140 and an arithmetic unit 150. The processor 110, the memory control unit 130, the DMA control unit 140 and the arithmetic unit 150 are connected with one another via a system bus 190. The external storage unit 200 is also connected to the system bus 190.

The processor 110 is configured to perform control and arithmetic operations necessary for execution of image processing. The memory 120 is a memory configured to hold therein image data to be subjected to image processing and work areas. The memory control unit 130 is configured to control access to the memory 120. The DMA control unit 140 is a controller configured to control DMA (Direct Memory Access) transfer performed between the external storage unit 200 and the memory 120. The arithmetic unit 150 is configured to perform control and arithmetic operations necessary for execution of image processing and, in general, has a higher arithmetic processing capacity than the processor 110. The processor 110 causes the arithmetic unit 150 to perform higher-load arithmetic operations to increase processing efficiency of the entire image processing device 100.

When image processing is to be performed using the information processing apparatus according to an embodiment of the present invention, first, image data is transferred from the external storage unit 200 to the memory 120. In the above mentioned data transfer, in general, a DMA transfer system is adopted. The data transfer using the DMA transfer system is controlled using the DMA control unit 140. Then, in the case that arithmetic operations using a luminance component in the image data are to be performed using the processor 110, the luminance component is read out from the memory 120 into the processor 110. On the other hand, in the case that arithmetic operations using a color component in the image data are to be performed using the arithmetic unit 150, the color component is read out from the memory 120 into the arithmetic unit 150.

Figure 2:
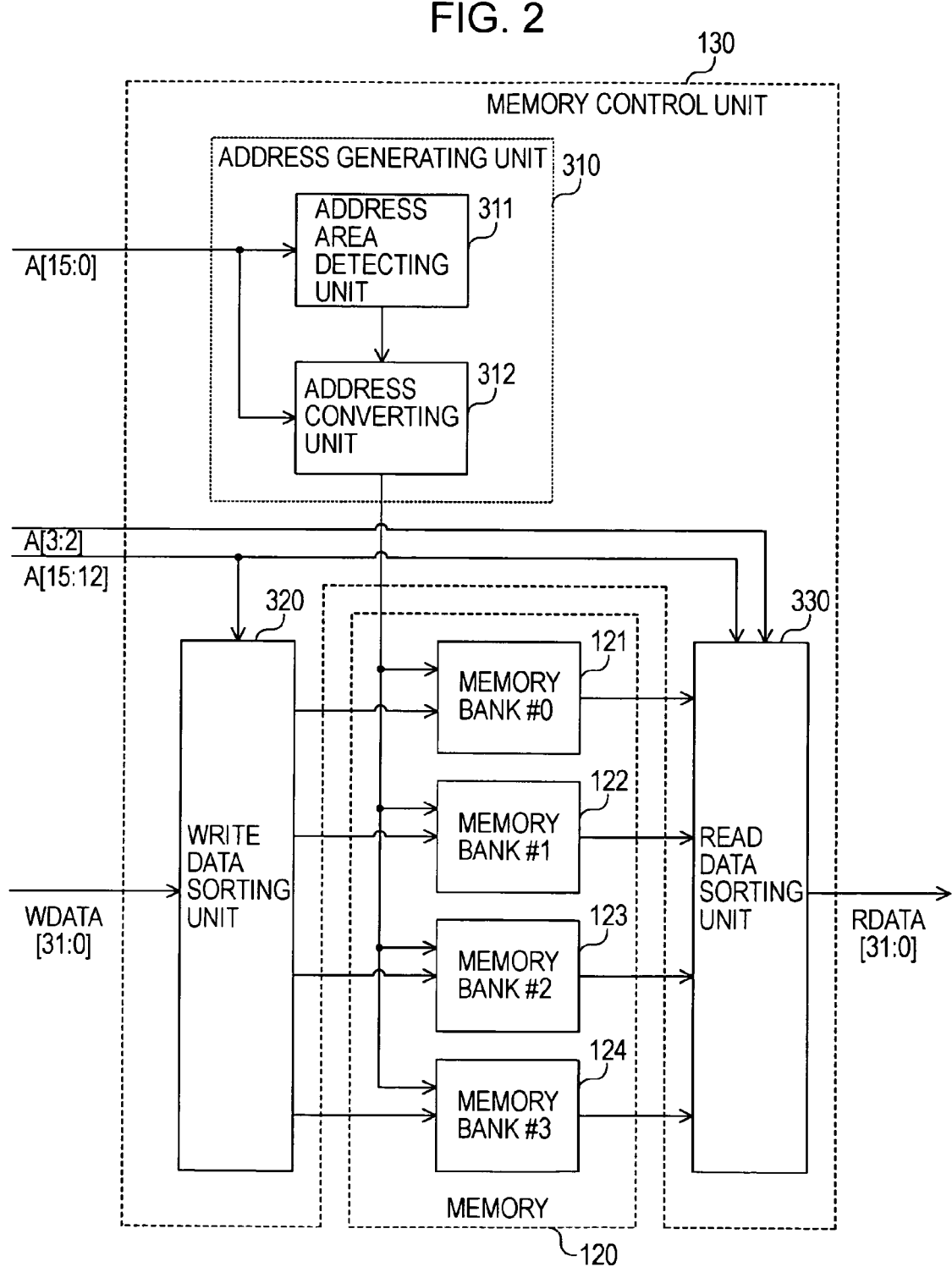
FIG. 2 is a diagram showing a structural example of a memory 120 and a memory control unit 130 according to an embodiment of the present invention.

FIG. 2 is a diagram showing a structural example of the memory 120 and the memory control unit 130 according to an embodiment of the present invention.

The memory 120 is constituted by four memory banks #0 to #3 (121 to 124). Each of the memory banks #0 to #3 (121 to 124) is configured to operate independently and is to hold a plurality of words that are 32 bits wide.

The memory control unit 130 includes an address generating unit 310, a write data sorting unit 320 and a read data sorting unit 330. The address generating unit 310 is configured to generate addresses to be supplied to the respective memory banks #0 to #3 (121 to 124) on the basis of an address A[15:0] that is 16 bits wide which has been input thereinto. The write data sorting unit 320 is configured to sort write data WDATA[31:0] that is 32 bits wide which has been input thereinto and to supply the sorted data that is 32 bits wide to the respective memory banks #0 to #3 (121 to 124). The read data sorting unit 330 is configured to sort the data read out from the respective memory banks #0 to #3 (121 to 124) and to output the sorted data as read data RDATA[31:0] that is 32 bits wide.

The address generating unit 310 includes an address area detecting unit 311 and an address converting unit 312. The address area detecting unit 311 is configured to detect an address area indicated by the input address A[15:0] that is 16 bits wide. The address converting unit 312 is configured to convert the address A[15:0] to an address for a physical area when the address area detecting unit 311 detects that the address A[15:0] is included in a virtual area.

In the example shown in FIG. 2, simultaneous accessing of data that is 128 bits may be realized using the four memory banks #0 to #3 (121 to 124). However, both write data and read data are set as data that is 32 bits wide, so that the width of 32 bits is sufficient as the data width of the system bus 190. Then, useful accessing may be realized by efficiently supplying data to the 32-bit data area of the system bus.

Figure 3:
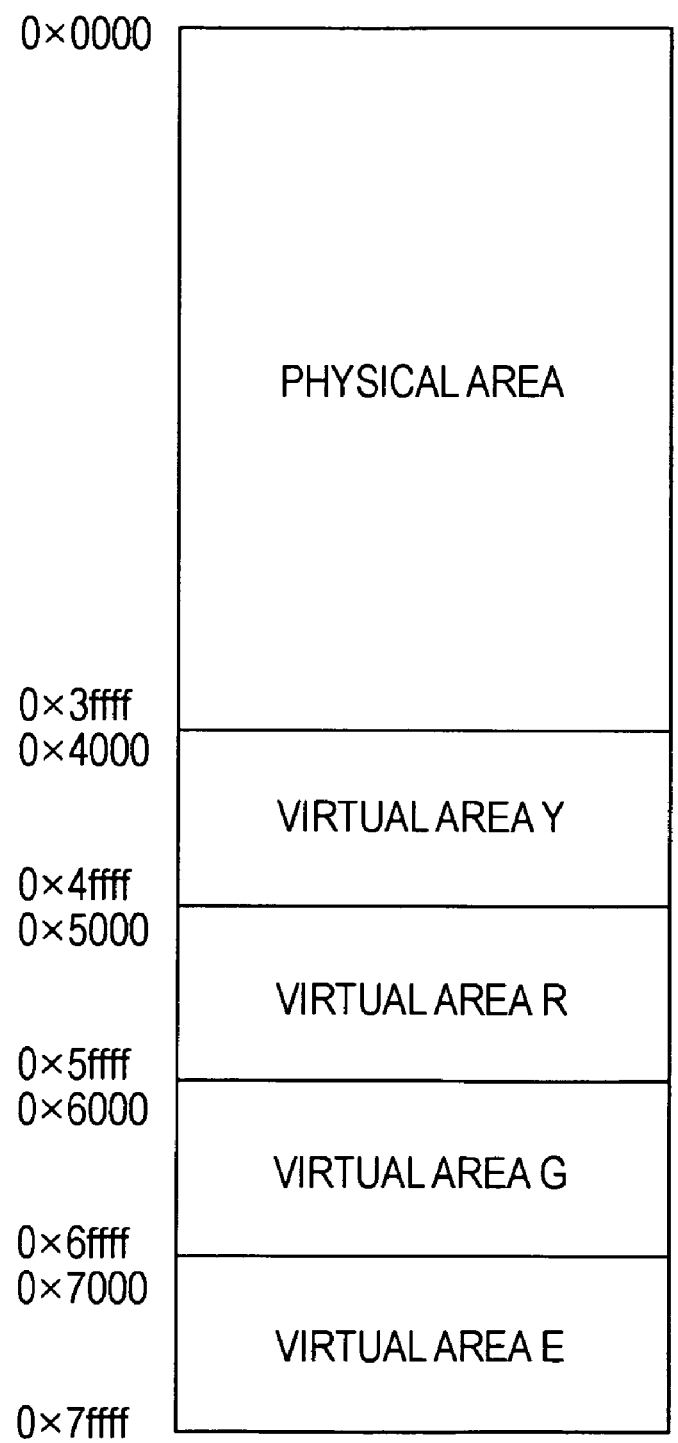
FIG. 3 is a chart showing an example of a relation between addresses and areas in the memory 120 according to an embodiment of the present invention.

FIG. 3 is a diagram showing an example of a relation between addresses and areas in the memory 120 according to an embodiment of the present invention. In the example, areas of addresses from "0x0000" ("0x" means that succeeding numerals are hexadecimal and so forth) to "0x3fff" are physical areas which are allocated as areas where data are actually held. On the other hand, areas of addresses from "0x4000" to "0x7fff" are virtual areas and the entities of these virtual areas are mapped in the physical areas.

Figure 4:
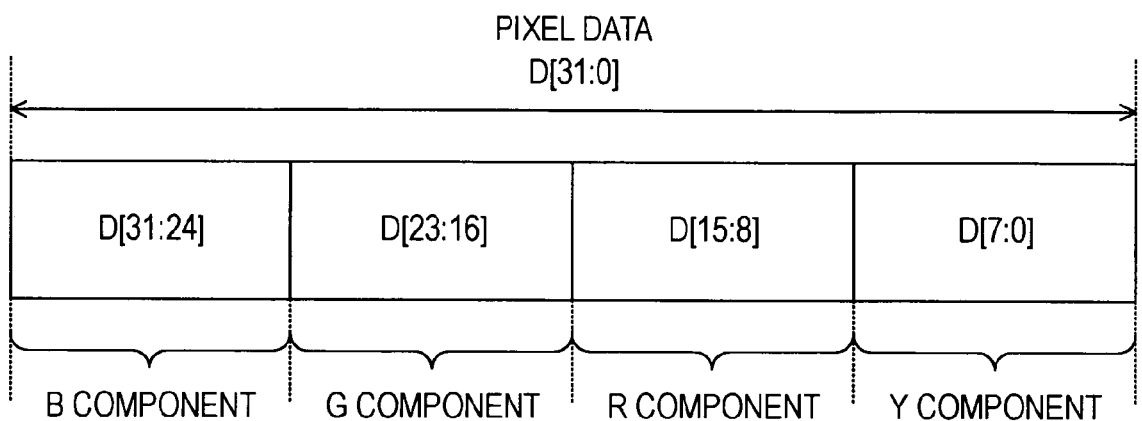
FIG. 4 is a diagram showing an example of a format of pixel data according to an embodiment of the present invention.

For example, as shown in FIG. 4, it is supposed that pixel data of each pixel in image data is constituted by structural data of four components, namely, of an Y component indicative of a luminance, an R component indicative of a red pixel value, a G component indicative of a green pixel value and a B component indicative of a blue pixel value. In this situation, it is also supposed that each component has a width of 8 bits and these components constitute pixel data D[31:0] that is 32 bits wide as a whole. In the memory banks #0 to #3 (121 to 124), the 32-bit pixel data is regarded as structural data of one word and data are arranged in units of the structural data. Thus, in the physical areas, components are allocated in units of structural data in accordance with the data arrangement in the memory banks #0 to #3 (121 to 124).

On the other hand, in the virtual areas, components are allocated in units of element data of pixel data. That is, Y components that are 8 bits wide are successively allocated to areas of addresses from "0x4000" to "0x4fff". R components that are 8 bits wide are successively allocated to areas of addresses from "0x5000" to "0x5fff". G components that are 8 bits wide are successively allocated to areas of addresses from "0x6000" to "0x6fff". B components that are 8 bits wide are successively allocated to areas of addresses from "0x7000" to "0x7fff".

FIG. 5 is a chart showing an example of a corresponding relation among element data, physical addresses and virtual addresses according to an embodiment of the present invention. Incidentally, a physical address denotes an address for a physical area and a virtual address denotes an address for a virtual area.

As described above, components are allocated in units of structural data to the physical areas. Thus, element data are allocated in the order of Y0, R0, G0, B0, Y1, R1, G1, B1, . . . in accordance with the ascending order of the physical addresses. Incidentally, Yi is the Y component of the i-th pixel data, Ri is the R component of the i-th pixel data, Gi is the G component of the i-th pixel data and Bi is the B component of the i-th pixel data.

On the other hand, in the virtual areas, respective components are allocated together and hence the order of allocation is different from that in the physical areas. That is, Y0 is allocated to the head "0x4000" of a virtual area Y, R0 is allocated to the head "0x5000" of a virtual area R, G0 is allocated to the head "0x6000" of a virtual area G and B0 is allocated to the head "0x7000" of a virtual area B. Likewise, Y1 is allocated to an address "0x4001" of the virtual area Y, R1 is allocated to an address "0x5001" of the virtual area R, G1 is allocated to an address "0x6001" of the virtual area G and B1 is allocated to an address "0x7001" of the virtual area B. That is, one physical address and one virtual address are allocated to each element data.

FIGS. 6A and 6B are charts showing examples of corresponding relations between element data and addresses according to an embodiment of the present invention.

As shown in FIG. 6A, in the physical areas, addresses are allocated in units of pixel data and hence accessing is allowed in units of pixel data. For example, in the case that the address "0x0000" has been specified, simultaneous accessing of the 0-th pixel data Y0, R0, G0 and B0 of 32 bits is allowed.

As shown in FIG. 6B, in the virtual areas, addresses are allocated in units of element data and hence accessing is allowed in units of element data. For example, in the case that the address "0x4000" has been specified, simultaneous accessing of the 8-bit Y components Y0, Y1, Y2 and Y3 amounting to 32 bits in total is allowed.

As described above, in either the physical areas or the virtual areas, accessing of data of 32 bits is allowed. That is, in the case that accessing is performed using the pixel data as the structural data, a physical address is used, while in the case that accessing is performed in units of element data, a virtual address is used, thereby allowing accessing of necessary data with no waste.

Figure 7A:
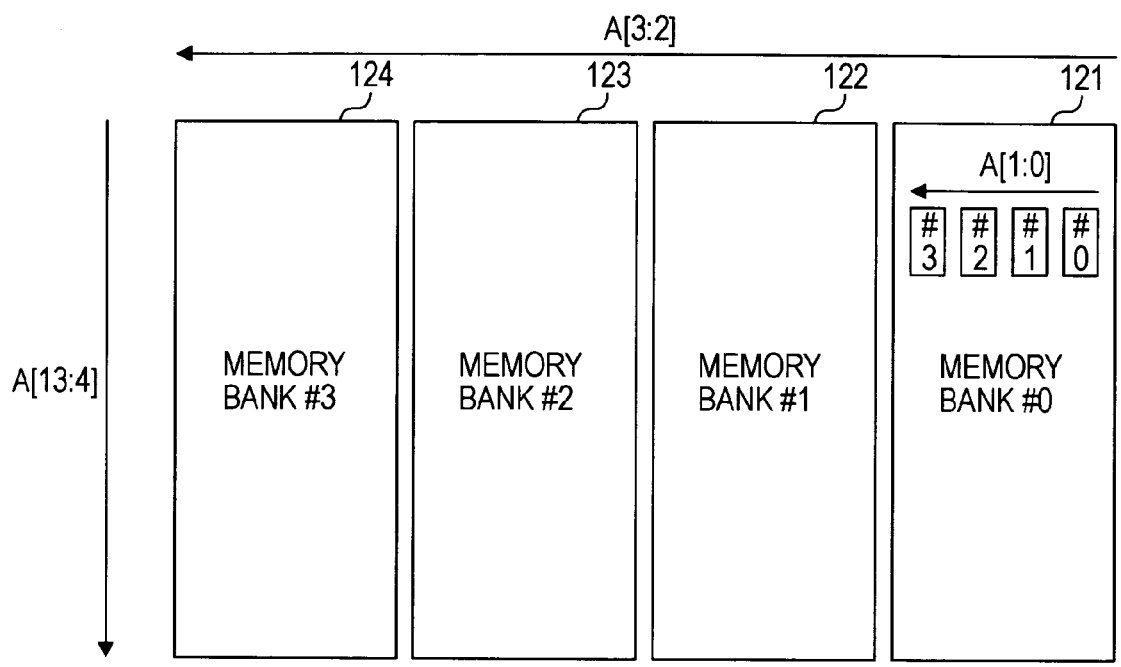
FIG. 7A is a diagram showing an example of a corresponding relation between memory banks and addresses according to an embodiment of the present invention.
Figure 7B:
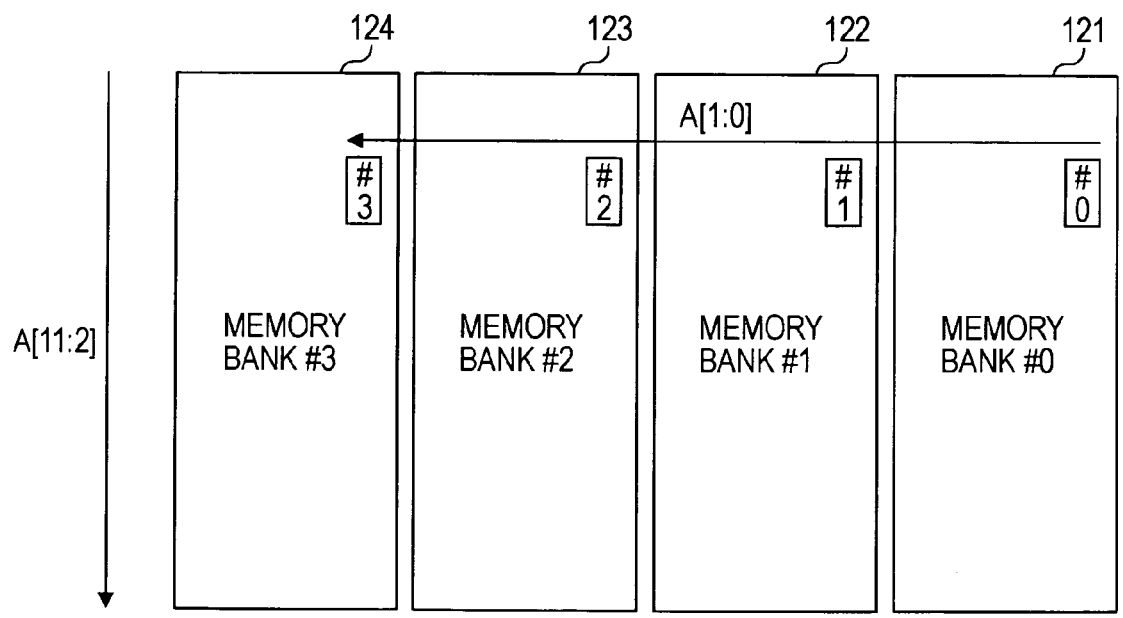
FIG. 7B is a diagram showing an example of a corresponding relation between memory banks and addresses according to an embodiment of the present invention.

FIGS. 7A and 7B are diagrams showing examples of corresponding relations between memory banks and addresses according to an embodiment of the present invention.

As shown in FIG. 7A, in each of the memory banks #0 to #3 (121 to 124), 32-bit pixel data is defined as structural data of one word and data are arranged in units of the structural data. In this situation, if addresses are allocated in units of element data in physical areas, a lower-order 2-bit address A[1:0] will indicate an address in a word (an in-word address) in each memory bank, a 2-bit address A[3:2] will indicate an address of a memory bank and a 10-bit address A[13:4] will indicate an address in a memory bank (an in-bank address).

On the other hand, in virtual areas, addresses are allocated in units of element data as shown in FIG. 7B, so that a lower-order 2-bit address A[1:0] indicates an address of a memory bank and a 10-bit address A[11:2] indicates an address in a memory bank (an in-bank address).

Figure 8:
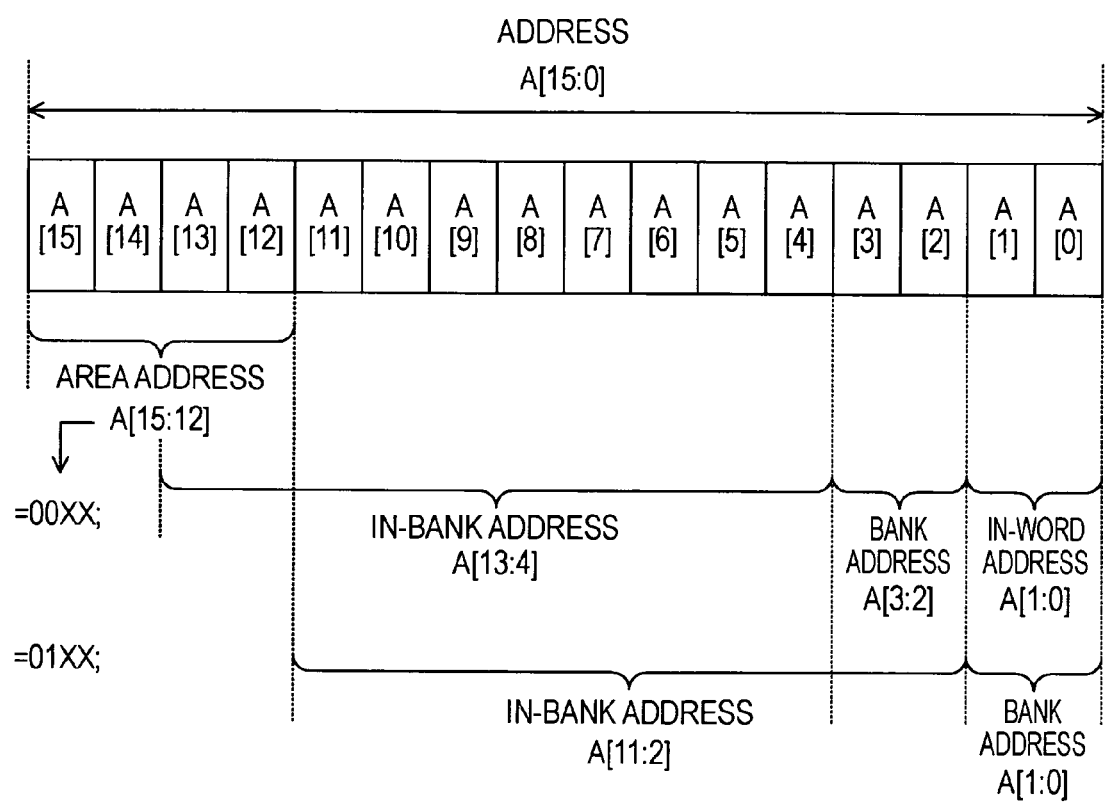
FIG. 8 is a diagram showing an example of a bit array of addresses according to an embodiment of the present invention.

FIGS. 8 and 9 are diagrams showing examples of the bit arrangement of addresses. In a 16-bit address A[15:0], a higher-order 4-bit address A[15:12] indicates an area address. That is, an area address "0b00xx" ("0b" means that succeeding numerals are binary, "x" means an arbitrary binary number and so forth) shows that an area concerned is a physical area. Likewise, an area address "0b0100" shows that it is a virtual area Y, an area address "0b0101" shows that it is a virtual area R, an area address "0b0110" shows that it is a virtual area G and an area address "0b0111" shows that it is a virtual area B.

In the case that an area address shows that an area concerned is a physical area, the address A[13:4] indicates the in-bank address of each memory bank, the address A[3:2] indicates the bank address of each memory bank and the address A[1:0] indicates the in-word address in each memory bank, as described above with reference to FIG. 7A. However, when it is supposed that the structural data are to be accessed as one set of data, in general, the in-word address is ignored. Thus, in data accessing on the basis of structural data, regardless of which one of addresses "0x0000" to "0x0003" is specified, the 32-bit pixel data Y0, R0, G0 and B0 will be accessed.

In the case that an area address shows that an area concerned is a virtual area, the address A[11:2] indicates the in-bank address of each memory bank and the address A[1:0] indicates the bank address of each memory bank, as described above with reference to FIG. 7B. That is, it is seen that the in-bank address and the bank address in a virtual area are addresses obtained by shifting rightward the in-bank address and the bank address in a physical area by two bits. Addition of the area address to these 2-bit-shifted addresses gives an address in a virtual area. Thus, the following relation is established:

Virtual address=area address+(physical address>>2)

wherein ">>" indicates right-shifting and a numeral on the right side indicates the number of shifting operations.

Incidentally, in a virtual area, an in-word address is fixed. That is, in the virtual area Y, the in-word address is "0b00", in the virtual area R, the in-word address is "0b01", in the virtual area G, the in-word address is "0b10" and in the virtual area B, the in-word address is "ob11". Note that the above mentioned in-word addresses are used for physical control in a memory bank and hence it may not be necessary for an access requesting side (for example, the processor 110) to take notice of the addresses.

Figure 10:
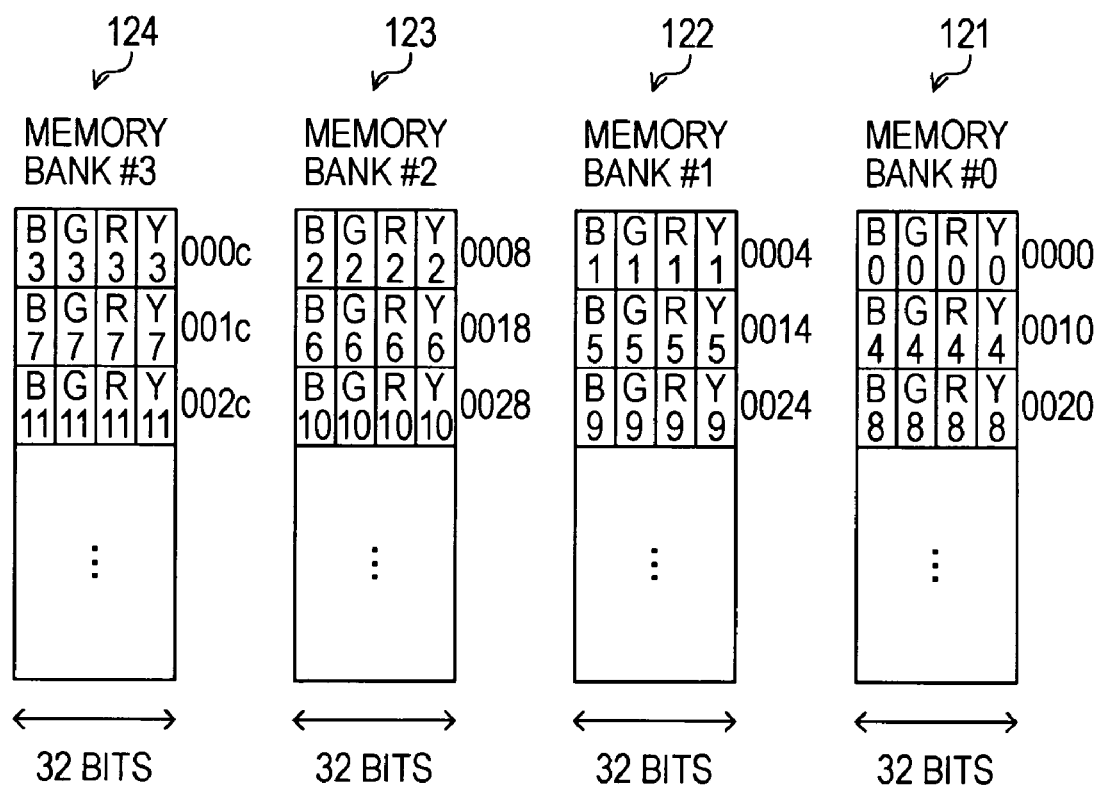
FIG. 10 shows an example of a corresponding relation between memory banks and element data according to an embodiment of the present invention.

FIG. 10 is a diagram showing examples of corresponding relations between memory banks and element data according to an embodiment of the present invention.

Each of the memory banks #0 to #3 (121 to 124) sets 32-bit pixel data constituting the structural data as one word and holds therein the pixel data as an element of an array. Then, the 32-bit data are sequentially allocated to different memory banks in units of the pixel data as the elements of the array. That is, the zeroth pixel data is held in the head word of the memory bank #0 (121), the first pixel data is held in the head word of the memory bank #1 (122), the second pixel data is held in the head word of the memory bank #2 (123) and the third pixel data is held in the head word of the memory bank #3 (124). Likewise, the fourth pixel data is held in the second word of the memory bank #0 (121), the fifth pixel data is held in the second word of the memory bank #1 (122), the sixth pixel data is held in the second word of the memory bank #2 (123) and the seventh pixel data is held in the second word of the memory bank #3 (124).

Figure 11A:
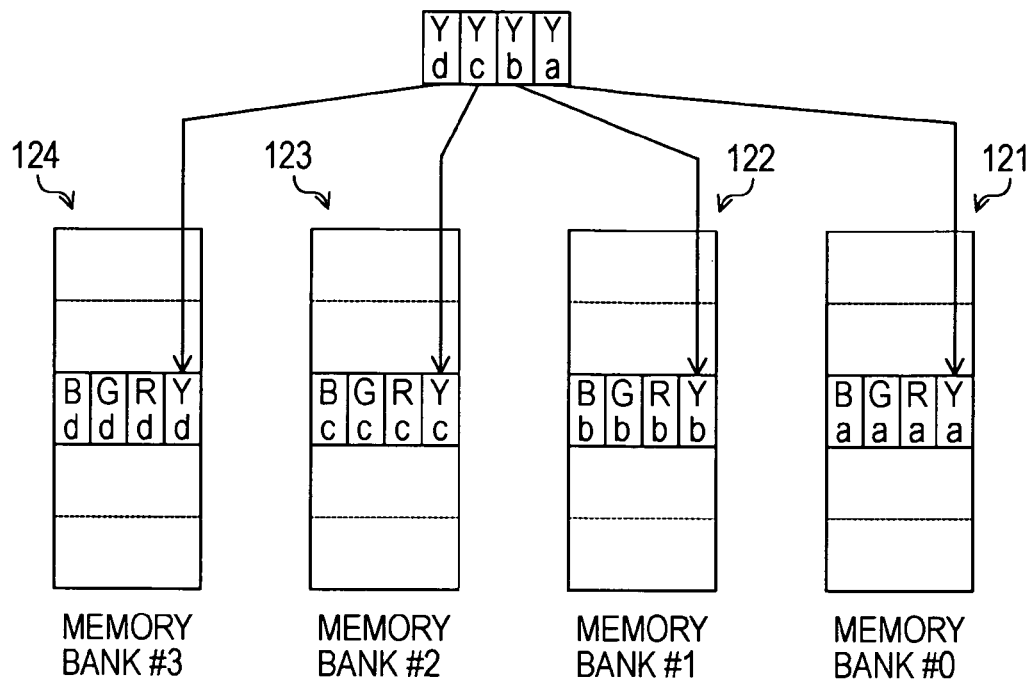
FIG. 11A shows an example of a corresponding relation between accessing performed on a virtual area and memory banks according to an embodiment of the present invention.
Figure 11B:
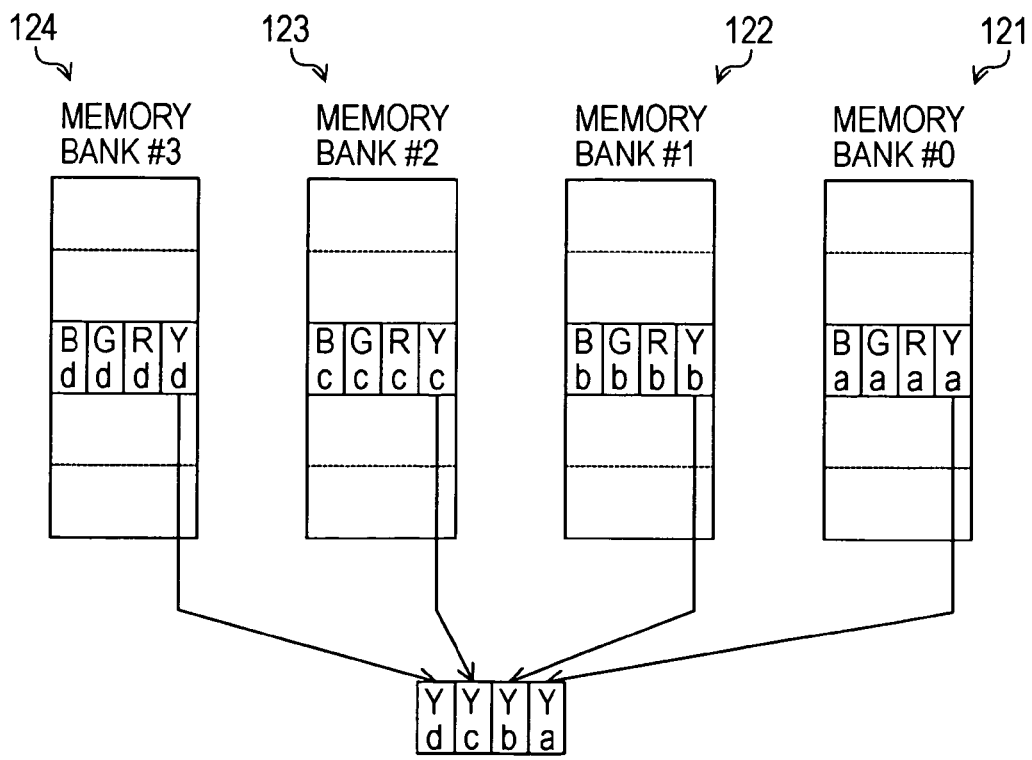
FIG. 11B shows an example of a corresponding relation between accessing performed on a virtual area and memory banks according to an embodiment of the present invention.

FIGS. 11A and 11B are diagrams showing examples of corresponding relations between accessing of virtual areas and memory banks according to an embodiment of the present invention.

In the case that writing of 8-bit data Ya, Yb, Yc and Yd (32 bits in total) in the virtual area Y has been instructed, corresponding data are written into lower-order 8-bit data (D[7:0]) of the word indicated by an address A[11:2] in respective memory banks simultaneously as shown in FIG. 11A.

In the case that reading out of data into the virtual area Y has been instructed, the data Ya, Yb, Yc and Yd (32 bits in total) of the lower-order 8-bit data (D[7:0]) of the word indicated by the address A[11:2] are read out simultaneously into the respective memory banks as shown in FIG. 11B.

In the examples shown in FIGS. 11A and 11B, accessing of the virtual area Y has been described. However, accessing is performed in the same manner as the above also in other virtual areas. That is, in the virtual area R, accessing is performed respectively on 8-bit data of data D[15:8] of the word indicated by an address A[11:2]. In the virtual area G, accessing is performed respectively on 8-bit data of data D[23:16] of the word indicated by an address A[11:2]. In the virtual area B, accessing is performed respectively on 8-bit data of data D[31:24] of the word indicated by an address A[11:2].

Figure 12:
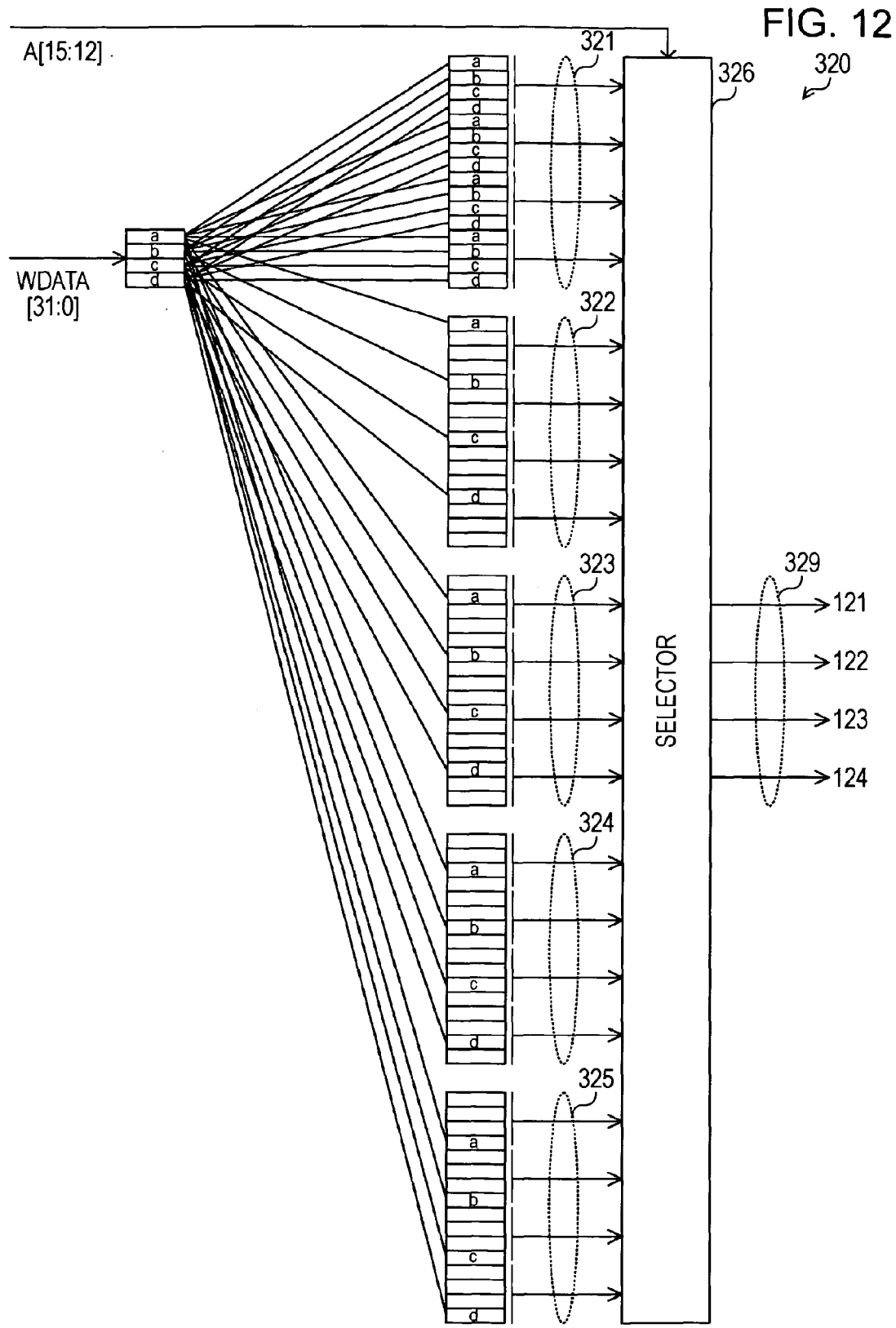
FIG. 12 is a diagram showing a structural example of a write data sorting unit 320 according to an embodiment of the present invention.

FIG. 12 is a diagram showing a structural example of a write data sorting unit 320 according to an embodiment of the present invention. 32-bit write data WDATA [31:0] and an area address A[15:12] are applied to the write data sorting unit 320.

The write data sorting unit 320 has a selector 326. The selector 326 is configured to select data on one of five sets of 128-bit signal lines 321 to 325 and to output data on the selected set of signal lines to 128-bit signal lines 329. Data of 128 bits in total obtained by distributing 32-bit write data WDATA[31:0] into four data are input into the signal lines 321. That is, assuming that data WD1[127:0] is input via the signal lines 321, the following data will be obtained:

WD1[31:0]=WDATA[31:0]
WD1[63:32]=WDATA[31:0]
WD1[95:64]=WDATA[31:0]
WD1[172:96]=WDATA[31:0]

In the drawing, "a", "b", "c" and "d" respectively indicate WDATA[7:0], WDATA[15:8], WDATA[23:16] and WDATA[31:24].

In addition, data of 128 bits in total obtained by dividing and embedding four 8-bit data of 32-bit write data WDATA [31:0] are input into the signal lines 322. That is, assuming that the data WD2[127:0] is input via the signal lines 322, the following data will be obtained:

WD2[7:0]=WDATA[7:0]
WD2[39:32]=WDATA[15:8]
WD2[71:64]=WDATA[23:16]
WD2[103:96]=WDATA[31:24]

The write data sorting unit 320 performs control such that data is not written over data of bits other than the above and hence the content of the original data is maintained in the data of other bits.

Data of 128 bits in total obtained by dividing and embedding four 8-bit data of 32-bit write data WDATA[31:0] are input into the signal lines 323. That is, assuming that the data WD3[127:0] is input via the signal lines 323, the following data will be obtained:

WD3[15:8]=WDATA[7:0]
WD3[47:40]=WDATA[15:8]
WD3[79:72]=WDATA[23:16]
WD3[111:104]=WDATA[31:24]

The write data sorting unit 320 performs control such that data is not written over data of bits other than the above and hence the content of the original data is maintained in the data of other bits.

Data of 128 bits in total obtained by dividing and embedding four 8-bit data of 32-bit write data WDATA[31:0] are input into the signal lines 324. That is, assuming that the data WD3[127:0] is input via the signal lines 324, the following data will be obtained:

WD4[23:16]=WDATA[7:0]
WD4[55:48]=WDATA[15:8]
WD4[87:80]=WDATA[23:16]
WD4[119:112]=WDATA[31:24]

The write data sorting unit 320 performs control such that data is not written over data of bits other than the above and hence the content of the original data is maintained in the data of other bits.

Data of 128 bits in total obtained by dividing and embedding four 8-bit data of 32-bit write data WDATA[31:0] are input into the signal lines 325. That is, assuming that data WD3[127:0] is input via the signal lines 325, the following data will be obtained:

WD5[31:24]=WDATA[7:0]
WD5[63:56]=WDATA[15:8]
WD5[95:88]=WDATA[23:16]
WD5[127:120]=WDATA[31:24]

The write data sorting unit 320 performs control such that data is not written over data of bits other than the above and hence the content of the original data is maintained in the data of other bits.

The selector 326 selects one of five sets of signal lines 321 to 325 in accordance with the area address A[15:12]. That is, if the area address A[15:12] is "0b00xx", the data on the signal lines 321 will be selected. Likewise, for "0b0100", the data on the signal lines 322 will be selected, for "0b0101", the data on the signal lines 323 will be selected, for "0b0110", the data on the signal lines 324 will be selected, and for "0b0111", the data on the signal lines 325 will be selected.

The data so selected are output to the signal lines 329. Assuming that data to be output to the signal lines 329 is data WD9[127:0], data WD9[31:0] will be supplied to the memory bank #0 (121), data WD9[63:32] will be supplied to the memory bank #1 (122), data WD9[95:64] will be supplied to the memory bank #2 (123) and data WD9[172:96] will be supplied to the memory bank #3 (124).

Figure 13:
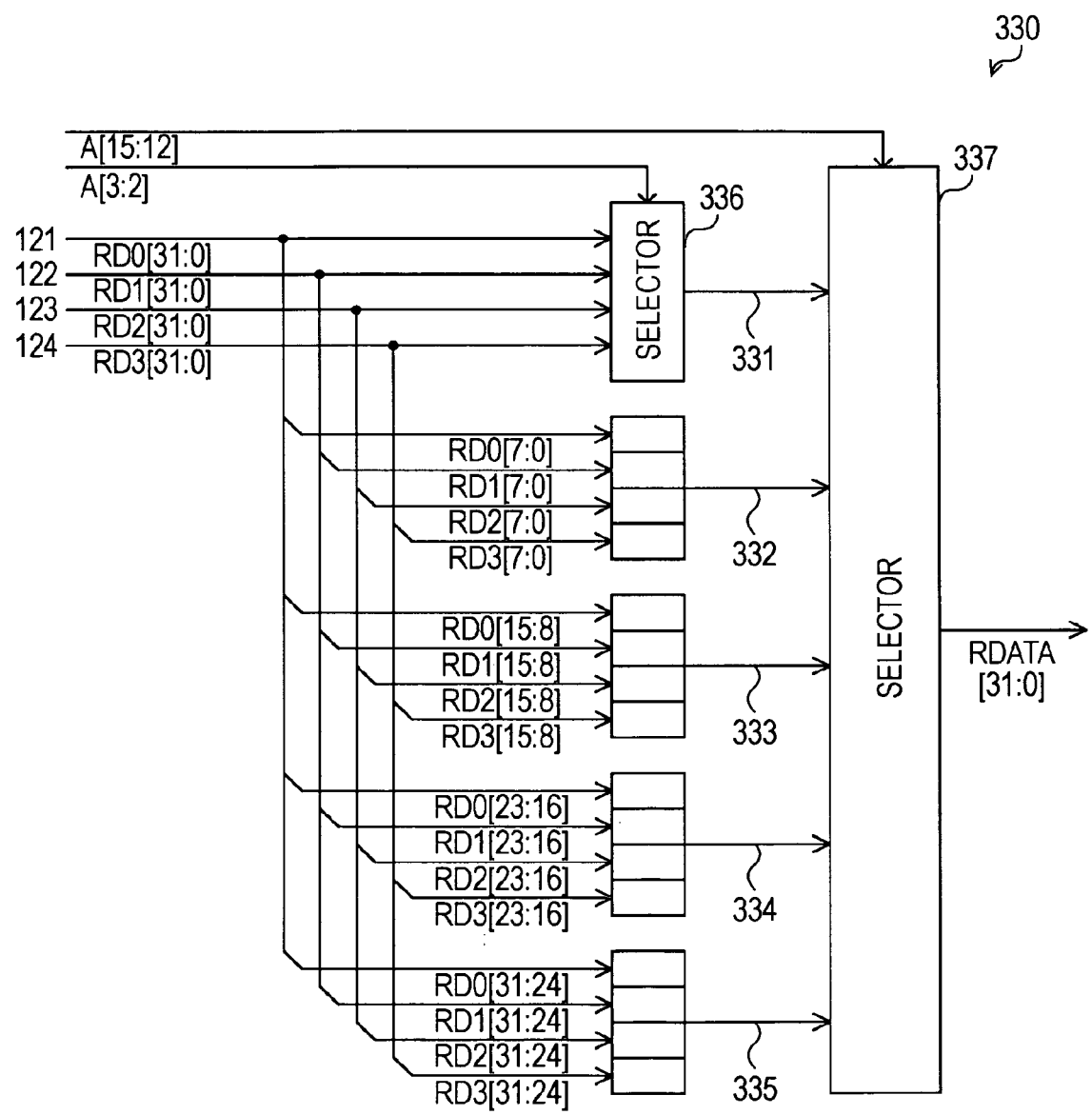
FIG. 13 is a diagram showing a structural example of a read data sorting unit 330 according to an embodiment of the present invention.

FIG. 13 is a diagram showing an example of the read data sorting unit 330 according to an embodiment of the present invention. Four sets of 32-bit read data RD0[31:0], RD1[31:0], RD2[31:0] and RD3[31:0], the area address A[15:12] and a bank address A[3:2] are supplied to the read data sorting unit 330. The read data sorting unit 330 has selectors 336 and 337.

The selector 336 is configured to select one of four sets of the 32-bit read data RD0[31:0], RD1[31:0], RD2[31:0] and RD3[31:0] and output the selected one set of read data to a signal line 331. The read data RD0[31:0] is data which has been read out from the memory bank #0 (121), the read data RD1[31:0] is data which has been read out from the memory bank #1 (122), the read data RD2[31:0] is data which has been read out from the memory bank #2 (123) and the read data RD3[31:0] is data which has been read out from the memory bank #3 (124).

The selector 336 selects any one of four sets of read data on the basis of the bank address A[3:2]. That is, if the bank address A[3:2] is "0b00", the data RD0[31:0] will be selected. Likewise, for "0b01", the data RD1[31:0] will be selected, for "0b10", the data RD2[31:0] will be selected, and for "0b11", the data RD3[31:0] will be selected.

The selector 337 is configured to select one of five 32-bit signals lines 331 to 335 and to output data on the selected signal line as 32-bit read data RDATA[31:0]. The data on the signal line 331 is used to handle reading out of data from a physical area using a physical address. The data on the signal line 332 is obtained by packaging 8-bit data RD0[7:0], RD1[7:0], RD2[7:0] and RD3[7:0] and is used to handle reading out of data from the virtual area Y. The data on the signal line 333 is obtained by packaging 8-bit data RD0[15:8], RD1[15:8], RD2[15:8] and RD3[15:8] and is used to handle reading out of data from the virtual area R. The data on the signal line 334 is obtained by packaging 8-bit data RD0[23:16], RD1[23:16], RD2[23:16] and RD3[23:16] and used to handle reading out of data from the virtual area G. The data on the signal line 335 is obtained by packaging 8-bit data RD0[31:24], RD1[31:24], RD2[31:24] and RD3[31:24] and is used to handle data reading out of data from the virtual area B.

The selector 337 selects one of five 32-bit signal lines 331 to 335 on the basis of the area address A[15:12]. That is, if the area address A[15:12] is "0b00xx", the signal line 331 will be selected. Likewise, for "0b0100", the signal line 332 will be selected, for "0b0101", the signal line 333 will be selected, for "0b0110", the signal line 334 will be selected, and for "0b0111", the signal line 335 will be selected.

As described above, according to an embodiment of the present invention, when the address area detecting unit 311 detects that the address A[15:0] is included in a virtual area, the address converting unit 312 converts the address A[15:0] into an address for a physical area so as to realize accessing of element data of structural data. Thus, in the case that data is accessed as structural data, an address for a physical area is used and, for accessing in units of element data, an address for a virtual area is used, thereby realizing accessing in a state in which only necessary data are packaged. As a result, a reduction in the number of respective processing operations is realized together with a reduction in traffic of the system bus. In particular, in an image filter in which in many cases, only luminance components are handled all together, the effect brought about by the application of an embodiment of the present invention is noticeably exhibited.

In the embodiment of the present invention, the memory control unit 130 is configured to exclusively execute functions of the apparatus, thereby attaining flexibility with certainty as compared with the case where the functions are dispersed to individual arithmetic units. That is, even in the case that extension or modification is necessary, it is sufficient to modify only the memory control unit 130 and hence the design of the information processing apparatus is simplified.

In the embodiment of the present invention, as an example of the structural data, the image data constituted by the Y, R, G and B components has been described. However, the present invention is not limited thereto and the present invention may be applied to other data. In the embodiment of the present invention, the memory constituted by the plurality of memory banks has been described by way of example. However, the present invention is not limited thereto and the present invention may be applied to other memories configured differently from the above mentioned memory.

The present application contains subject matter related to that disclosed in Japanese Priority Patent Application JP 2008-152642 filed in the Japan Patent Office on Jun. 11, 2008, the entire content of which is hereby incorporated by reference.

It should be understood by those skilled in the art that although the embodiment of the present invention shows an example for embodying the present invention and has a corresponding relation with the specific inventive matters defined in the appended claims, the present invention is not limited thereto and various modifications, combinations, subcombinations and alterations may occur depending on design requirements and other factors insofar as they are within the scope of the appended claims or the equivalents thereof.

What is claimed is:

1. An information processing apparatus comprising:
 a memory configured such that structural data areas holding therein structural data, each being constituted by a plurality of pieces of element data, are allocated to a plurality of memory banks;
 an address area detecting unit configured to detect whether an address value used to access the memory is included in a specific address area including an address used to access the plurality of pieces of element data; and
 an address converting unit configured to convert the address value to an address value for the structural data area in the case that it has been detected that the address value is included in the specific address area.

2. The apparatus according to claim 1, wherein
 the plurality of pieces of element data are packaged into one word and each of a plurality of words is held in the structural data as an element of an array,
 the plurality of words are sequentially allocated to different memory banks of the plurality of memory banks on a word-by-word basis, and
 the address converting unit is configured to convert the address value such that, in the case that it has been detected that the address value is included in the specific address area, the plurality of pieces of element data included in the structural data respectively allocated to the plurality of memory banks are simultaneously accessed from the plurality of memory banks in one-to-one correspondence.

3. The apparatus according to claim 2, further comprising:
 a write data sorting unit configured to sort write data such that, in the case that it has been detected that the address value is included in the specific address area, element data included in the write data of the same size as the structural data are written into the plurality of memory banks in one-to-one correspondence.

4. The apparatus according to claim 2, further comprising:
 a read data sorting unit configured to sort the element data which have been read out from the plurality of memory banks in one-to-one correspondence as read data of the same size as the structural data in the case that it has been detected that the address value is included in the specific address area.

5. The apparatus according to claim 1, wherein the structural data is pixel data of an image and the plurality of pieces of element data are component data relating to a luminance or a color of the pixel data.

6. A memory controlling device comprising:
 an address area detecting unit configured to detect whether an address value used to access a memory configured such that structural data areas holding therein structural data, each being constituted by a plurality of pieces of element data, are allocated to a plurality of memory banks is included in a specific address area including an address used to access the plurality of pieces of element data; and
 an address converting unit configured to convert the address value to an address value for the structural data area in the case that it has been detected that the address value is included in the specific address area.

7. An information processing apparatus comprising:
 a memory configured such that structural data areas holding therein structural data, each being constituted by a plurality of pieces of element data, are allocated;
 an address area detecting unit configured to detect whether an address value used to access the memory is included in a specific address area including an address used to access the plurality of pieces of element data; and
 an address converting unit configured to convert the address value to an address value for the structural data area in the case that it has been detected that the address value is included in the specific address area.

8. A memory control device comprising:
 an address area detecting unit configured to detect whether an address value used to access a memory configured such that structural data areas holding therein structural data, each being constituted by a plurality of pieces of element data, are allocated is included in a specific address area including an address used to access the plurality of pieces of element data; and
 an address converting unit configured to convert the address value to an address value for the structural data area in the case that it has been detected that the address value is included in the specific address area.

* * * * *